US011112144B2

(12) United States Patent
Suryawanshi et al.

(10) Patent No.: US 11,112,144 B2
(45) Date of Patent: Sep. 7, 2021

(54) CURVED SURFACE ABSORBER TYPE SOLAR FLUID HEATER

(71) Applicants: Sanjeev Damodar Suryawanshi, Maharashtra (IN); Narendra Nilkanth Pawar, Maharashtra (IN)

(72) Inventors: Sanjeev Damodar Suryawanshi, Maharashtra (IN); Narendra Nilkanth Pawar, Maharashtra (IN)

(*) Notice: Subject to any disclaimer, the term of this patent is extended or adjusted under 35 U.S.C. 154(b) by 0 days.

(21) Appl. No.: 16/474,160

(22) PCT Filed: Dec. 28, 2017

(86) PCT No.: PCT/IN2017/050619
§ 371 (c)(1),
(2) Date: Jun. 27, 2019

(87) PCT Pub. No.: WO2018/122870
PCT Pub. Date: Jul. 5, 2018

(65) Prior Publication Data
US 2019/0346179 A1      Nov. 14, 2019

(30) Foreign Application Priority Data

Dec. 28, 2016  (IN) .......................... IN201621022124

(51) Int. Cl.
*F24S 60/30* (2018.01)
*F24S 10/70* (2018.01)
(Continued)

(52) U.S. Cl.
CPC .............. *F24S 60/30* (2018.05); *F24S 10/40* (2018.05); *F24S 10/70* (2018.05); *F24S 70/60* (2018.05);
(Continued)

(58) Field of Classification Search
CPC .. F24S 60/30; F24S 10/70; F24S 10/40; F24S 2020/18; F24S 40/53; F24S 40/60; F24S 70/60
(Continued)

(56) References Cited

U.S. PATENT DOCUMENTS 4,086,911 A * 5/1978 Futch ...................... F24S 60/30
                                                               126/591
4,098,263 A * 7/1978 Lanciault ................ F24S 60/30
                                                               126/623
(Continued)

FOREIGN PATENT DOCUMENTS

EP          0466107 A1 * 1/1992 .............. F24S 25/10
FR          2367993 A1 * 5/1978 .............. F24S 60/30
(Continued)

*Primary Examiner* — Steven B McAllister
*Assistant Examiner* — Daniel E. Namay
(74) *Attorney, Agent, or Firm* — DeLio Peterson & Curcio LLC; Robert Curcio

(57) ABSTRACT

A curved surface absorber type solar fluid heater having radially spaced curved surfaces, preferably hemispherical and closed at bottom periphery, defining a closed chamber termed as collector which receives a fluid to be heated. The curved surface absorber type solar fluid heater encompasses two radially spaced transparent curved surfaces preferably hemispherical, closed at bottom periphery, placed over collector termed as a glazing, and an insulated hemispherical hot fluid tank, placed within the cavity of inner curved surface of the collector and bottom insulation. A plurality of plumbing connections is made between the collector and the hot fluid tank with arrangement of non-return valves to prevent backflow of fluid from hot fluid tank towards the collector. An air vent is located at the highest position of the collector. A drain plug is located at a lowest position on the collector.

19 Claims, 7 Drawing Sheets

(51) Int. Cl.
  *F24S 40/53* (2018.01)
  *F24S 10/40* (2018.01)
  *F24S 70/60* (2018.01)
  *F24S 20/00* (2018.01)
  *F24S 40/60* (2018.01)

(52) U.S. Cl.
  CPC ............... *F24S 40/53* (2018.05); *F24S 40/60* (2018.05); *F24S 2020/18* (2018.05)

(58) Field of Classification Search
  USPC ............... 126/640, 663, 652, 619, 639, 634
  IPC .................................................. F24J 2/04, 2/05
  See application file for complete search history.

(56) References Cited

U.S. PATENT DOCUMENTS

| | | | | | |
|---|---|---|---|---|---|
| 4,116,223 | A | * | 9/1978 | Vasilantone | F24S 60/30 126/643 |
| 4,132,221 | A | * | 1/1979 | Orillion | F24S 80/50 126/572 |
| 4,154,657 | A | * | 5/1979 | Dennen | B01D 5/0066 202/234 |
| 4,187,832 | A | * | 2/1980 | Tregoning | F24S 10/72 126/676 |
| 4,203,805 | A | * | 5/1980 | Diggs | F24S 60/30 202/176 |
| 4,235,680 | A | * | 11/1980 | Diggs | C02F 1/14 203/2 |
| 4,249,520 | A | * | 2/1981 | Orillion | F24S 60/30 126/651 |
| 4,282,859 | A | * | 8/1981 | Hayward | F24S 10/00 126/647 |
| 4,294,228 | A | * | 10/1981 | Kruger | F24S 10/40 126/609 |
| 4,341,203 | A | * | 7/1982 | Bloxsom | F24S 20/20 126/651 |
| 4,341,204 | A | * | 7/1982 | Bloxsom | F24S 20/20 126/651 |
| 4,398,053 | A | * | 8/1983 | Orillion | H01L 31/0547 136/248 |
| 4,541,416 | A | * | 9/1985 | Leininger | F24S 20/20 126/706 |
| 4,644,935 | A | * | 2/1987 | Gallagher | F24D 19/1057 126/588 |
| 4,756,300 | A | * | 7/1988 | Ewers | A01K 63/065 126/567 |
| 4,757,803 | A | * | 7/1988 | Dixon | F24S 60/30 126/640 |
| 4,782,816 | A | * | 11/1988 | Salgado | F24S 80/50 126/590 |
| 4,830,677 | A | * | 5/1989 | Geisler, Jr. | F24S 23/30 136/248 |
| 5,315,938 | A | * | 5/1994 | Freller | F23G 5/40 110/233 |
| 6,244,062 | B1 | * | 6/2001 | Prado | F24S 80/50 62/235.1 |
| 2007/0227528 | A1 | * | 10/2007 | Mehler | F24S 10/753 126/569 |
| 2007/0227532 | A1 | * | 10/2007 | Mehler | F24S 10/70 126/640 |
| 2009/0178348 | A1 | * | 7/2009 | Flaherty | F24S 70/60 52/81.1 |
| 2009/0250053 | A1 | * | 10/2009 | Flaherty | F24S 80/60 126/709 |
| 2010/0071685 | A1 | * | 3/2010 | Gaiti | F24S 60/30 126/640 |
| 2011/0220099 | A1 | * | 9/2011 | Flaherty | F16L 59/065 126/709 |
| 2014/0083414 | A1 | * | 3/2014 | Ruiz | F24H 1/202 126/612 |
| 2016/0187030 | A1 | * | 6/2016 | Munoz Ruiz | F24S 10/40 126/680 |
| 2016/0315583 | A1 | * | 10/2016 | Dakhil | F03G 6/00 |

FOREIGN PATENT DOCUMENTS

| | | | | |
|---|---|---|---|---|
| FR | 2454063 | A1 * | 11/1980 | ............ F24S 60/30 |
| FR | 2468077 | A1 * | 4/1981 | ............ F24S 60/30 |
| JP | 56077642 | A * | 6/1981 | ............ F24S 23/79 |
| JP | 2016223696 | A * | 12/2016 | ............ F24S 60/30 |
| WO | WO-8301501 | A1 * | 4/1983 | ............ F24S 80/60 |
| WO | WO-9920954 | A1 * | 4/1999 | ............ F24S 80/54 |
| WO | 2005003643 | A1 | 1/2005 | |
| WO | 2011008187 | A1 | 1/2011 | |

* cited by examiner

CURVED SURFACE ABSORBER TYPE SOLAR FLUID HEATER

FIELD OF THE INVENTION

The present invention relates to solar fluid heaters and more particularly to a curved surface absorber type solar fluid heater.

BACKGROUND OF THE INVENTION

Solar energy collectors are special kind of heat exchangers that utilize solar radiation energy to facilitate heating of fluids. The major component of any solar system is a solar collector. The solar collector is a device which absorbs incoming solar radiation, converts it into heat, and transfers this heat to a fluid flowing through the collector. In prior art systems, the heated fluid is stored in an insulated hot fluid tank for further use thereof. In general, the solar fluid heating systems have the collector and hot fluid tank located separately from each other and accordingly such systems need excessive use of all-around insulation except for a solar aperture or window in order to prevent heat loss, which substantially increases the cost of these devices. Moreover, separate positioning of the collector and hot fluid tank make these devices bulky, heavy, and unnecessarily larger in size.

Accordingly, attempts have been made to develop various types of storage cum absorber type solar fluid heating systems. For example, in some solar fluid heating systems, a rectangular box with multiple channels within said rectangular box acts as a collector thereby having a top surface of the box acting as an absorber. However, after prolonged use, most of these boxes tend to inflate, resulting into fluid leakage problems, making them unusable.

In flat plate collectors (hereinafter "FPCs"), fins are directly connected to the top surface of the tube wherein solar radiation falls on the fins, thereby facilitating absorption of the solar radiation to heat the fluid tubes and surrounding air. This, in turn, heats the fluid in the tubes. However, such a design imposes additional thermal resistance in the heat transfer process increasing the heat loss coefficient in existing FPCs.

In evacuated tube collectors (hereinafter "ETCs"), due to a gap between tubes, the whole aperture cannot be used as an absorber to trap solar radiation. The glass tube is prone to breakage during transportation, installation, and periodic maintenance. During removal of hot fluid, mixing of supply ambient fluid with hot fluid in hot fluid tank reduces the temperature of hot fluid, and is a major problem in most of the existing ETCs. In cylindrical hot fluid tanks, the mixing problem is more acute.

In general, all above-mentioned types of solar fluid heaters have difficulty in installation as space with availability of solar radiation is a major issue for people residing in small flats in urban areas. Further, cost is a major issue in middle class families for purchasing solar fluid heating systems. Most of the present solar fluid heating systems use high grade material like more metallic parts, glass tubes, and insulation, and impose limitations in long run in the world of energy crises.

SUMMARY OF THE INVENTION

Bearing in mind the problems and deficiencies of the prior art, it is therefore an object of the present invention to provide a solar collector system which uses the whole aperture area as an absorber, reduces the size of the collector, improves the heat utilization factor, sustains fluid pressure and retains its shape, reduces insulation requirements, reduces heat loss from the hot fluid tank, and reduces mixing of hot and ambient fluid during removal of hot fluid. Further, there is need to develop a solar collector system which has low cost, breakage free transportation, installation, and maintenance.

It is a further object of the present invention to develop a solar collector system that reduces the problem of incorrect due south inclination of the collector during system installation thereby facilitating easy removal of sediments from the collector thereof.

The present invention provides a curved surface absorber type solar fluid heater which includes two radially spaced curved surfaces, preferably of hemispherical shape, closed at the bottom periphery forming a closed chamber defining a collector. The collector is equipped to receive a fluid to be heated therein. The curved surface absorber type solar fluid heater includes two radially spaced transparent curved surfaces that are closed at the bottom periphery thereof and positioned over the collector as a glazing. The curved surface absorber type solar fluid heater includes an insulated hemispherical hot fluid tank preferably positioned within the cavity of an inner curved surface of the collector and bottom insulation. The curved surface absorber type solar fluid heater includes a plurality of first connecting members that facilitate connections between the collector and hot fluid tank. The hot fluid tank has a non-return valve and an air vent positioned thereon. The non-return valve prevents backflow of fluid from hot fluid tank towards collector in absence of sunshine. The air vent is preferably located at the highest position of the collector and most preferably in proximity to the top end of the collector. The glazing, the collector, and the hot fluid tank are placed on the bottom insulation. The collector and glazing are substantially concentric in accordance with a preferred embodiment of the present invention. However, it is understood that the collector and glazing may be non-concentric in other alternative embodiments of the present invention. The curved surface absorber type solar fluid heater includes a plurality of second connecting members that facilitate connections between an ambient fluid supply tank and the collector. The curved surface absorber type solar fluid heater includes a drain plug that is located at a lowest position on the collector in order to facilitate easy removal of sediment.

The collector gets heated by absorbing incoming solar radiation that in turn heats the fluid to develop a thermo siphon circulation of fluid in between the collector and hot fluid tank such that the temperature of the hot fluid increases until the thermal equilibrium between collector and the surrounding is reached. It is understood, however, that the fluid from the hot fluid tank can be consumed as and when required thereby removing hot fluid from a highest position thereof. The hemispherical shape of the hot fluid tank and highest position of removal of hot fluid mutually reduces temperature loss which may occur due to mixing of supply ambient fluid with hot fluid. The unique combination of the shape of the collector and the position of the hot fluid outlet in the present invention enables heating of the fluid to a higher temperature in a given time and at given solar radiations.

In the context of the present invention, installation of a hot fluid tank within the collector not only reduces the insulation requirement but also reduces heat loss from the outer surface thereof. Further, as the hot fluid tank is placed within the collector, convection loss is negligible. In addition, the collector has a double walled construction that holds hot fluid inside and provides an additional hot fluid jacket to hot fluid contained with the hot fluid tank thereby preventing convection heat loss even in adverse situations like evening/night hours during which climate is windy and solar radiation is poor.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
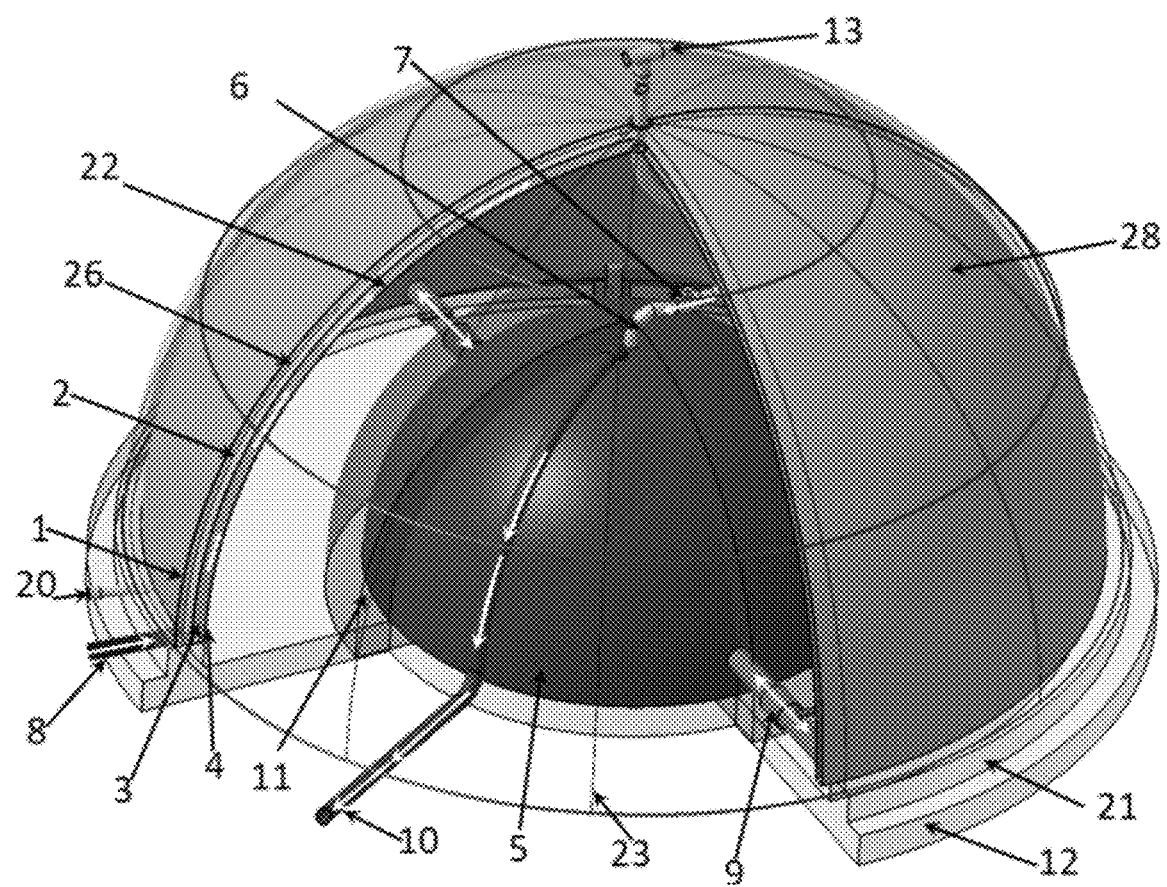
FIG. 1 is a fragmentary sectional perspective view of a curved surface absorber type solar fluid heater constructed in accordance with the preferred embodiment of the present invention.

In describing the preferred embodiment of the present invention, reference will be made herein to FIGS. 1-6 of the drawings in which like numerals refer to like features of the invention.

Although specific terms are used in the following description for sake of clarity, these terms are intended to refer only to particular structure of the invention selected for illustration in the drawings, and are not intended to define or limit the scope of the invention.

Figure 1A:
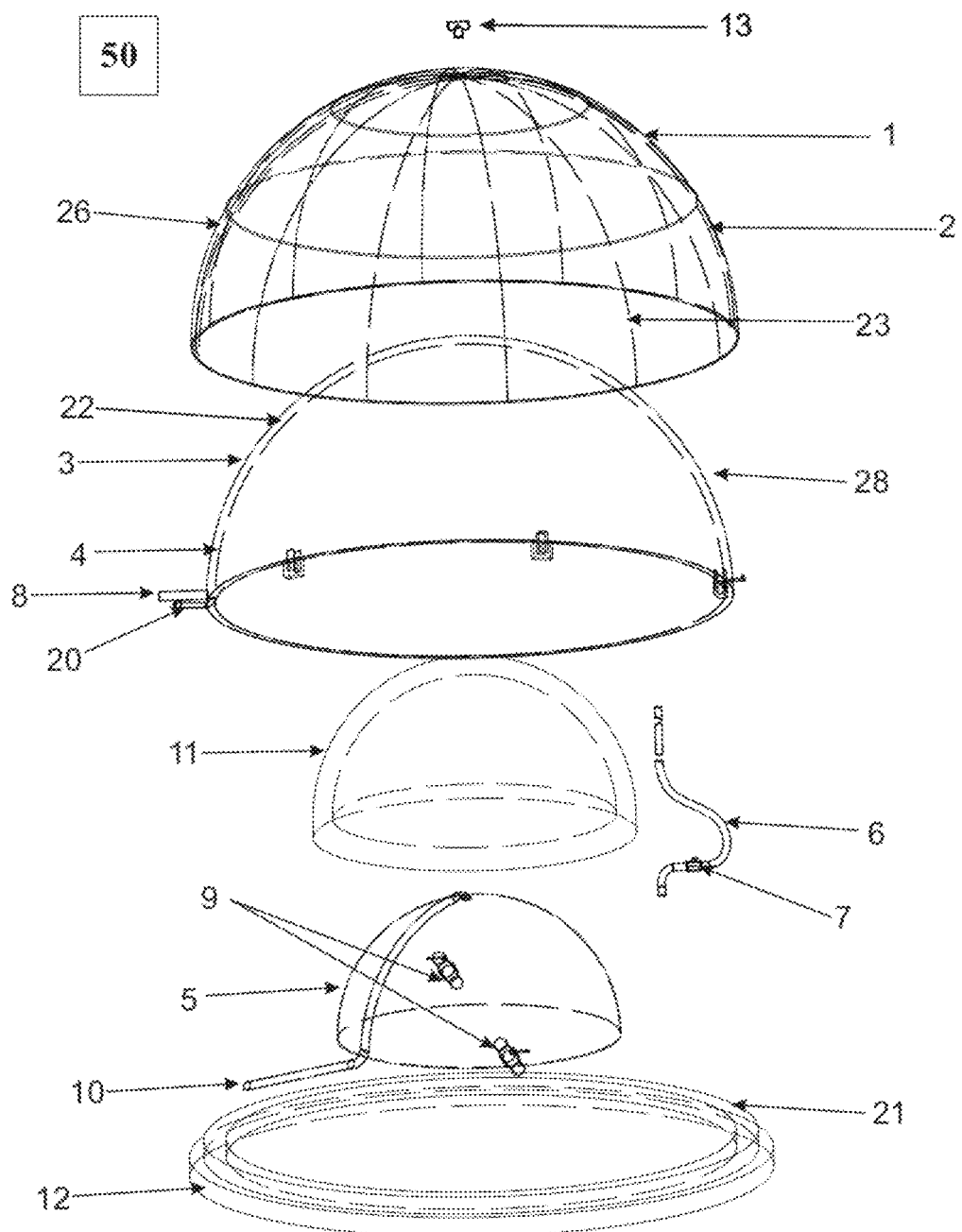
FIG. 1A is an exploded view of the curved surface absorber type solar fluid heater of FIG. 1.

Referring to FIGS. 1 and 1A, a fragmentary sectional perspective front view of a hemispherical absorber type solar fluid heater 50 in accordance with the preferred embodiment of the present invention is shown. The hemispherical absorber type solar fluid heater 50 has an approximately hollow hemispherical construction that mainly includes an outer transparent glazing 1, an inner transparent glazing 2, a black outer curved surface 3, and an inner curved surface 4. A first chamber 26 is defined between the outer transparent glazing 1 and the inner transparent glazing 2. A second chamber 22 is defined between the black outer curved surface 3 and the inner curved surface 4. The second chamber 22 is configured to receive a fluid to be heated therein. The second chamber 22 formed by curved surfaces 3, 4 define a collector 28 of the hemispherical absorber type solar fluid heater 50 in accordance with the present invention. In an embodiment, the collector 28 may have a plurality of indentations on either inner surface or outer surface or on both inner and outer surfaces in order to impart strength to the collector 28. In addition, the hemispherical absorber type solar fluid heater 50 includes a support grill 23 that facilitates support for hemispherical curved surfaces of the transparent glazing 1, 2.

The hemispherical absorber type solar fluid heater 50 includes a hot fluid tank 5, preferably of hemispherical shape. However, it is understood that the shape of hot fluid tank 5 may vary in other alternative embodiments of the present invention. In this preferred embodiment, the hemispherical hot fluid tank 5 is enclosed concentrically within an enclosure formed by the collector 28 and the base insulation 12. However, it is understood that the hemispherical hot fluid tank 5 may be positioned in an off-centered position within the collector in alternative embodiments of the present invention. Further, it is understood that the hot fluid tank 5 may be positioned outside the collector 28 in other alternative embodiments of the present invention.

The hemispherical absorber type solar fluid heater 50 includes a plurality of connecting members including but not limited to a hot fluid tank inlet pipe 6, an ambient fluid pipe 8, an opposed pair of recirculation connectors 9 and a hot fluid tank outlet pipe 10. The hot fluid tank inlet pipe 6 connects the second chamber 22 to the hot fluid tank 5. The hot fluid tank inlet pipe 6 includes a non-return valve 7 positioned thereon. The ambient fluid pipe 8 connects to an overhead fluid supply tank (not shown). The recirculation connectors 9 facilitate connection between the collector 28 and hot fluid tank 5. In particular, the connectors 9 facilitate flow of fluid from hot water tank 5 to collector 28 during sunshine hours. In addition, the connectors 9 facilitate flow of fluid from collector to hot water tank 5 during usage of hot water stored in the hot water tank.

The ambient fluid pipe 8 is positioned along a plane that is normal to a plane of recirculation connectors 9. In this preferred embodiment, an angle between the ambient fluid pipe 8 and the recirculation connectors 9 is approximately 90°. However, it is understood that said angle between the ambient fluid pipe 8 and the recirculation connectors 9 may vary in other alternative embodiments of the present invention. The hot fluid tank outlet pipe 10 facilitates dispensing of hot fluid for usage. The collector 28 of the hemispherical absorber type solar fluid heater 50 includes an air vent 13.

Figure 2:
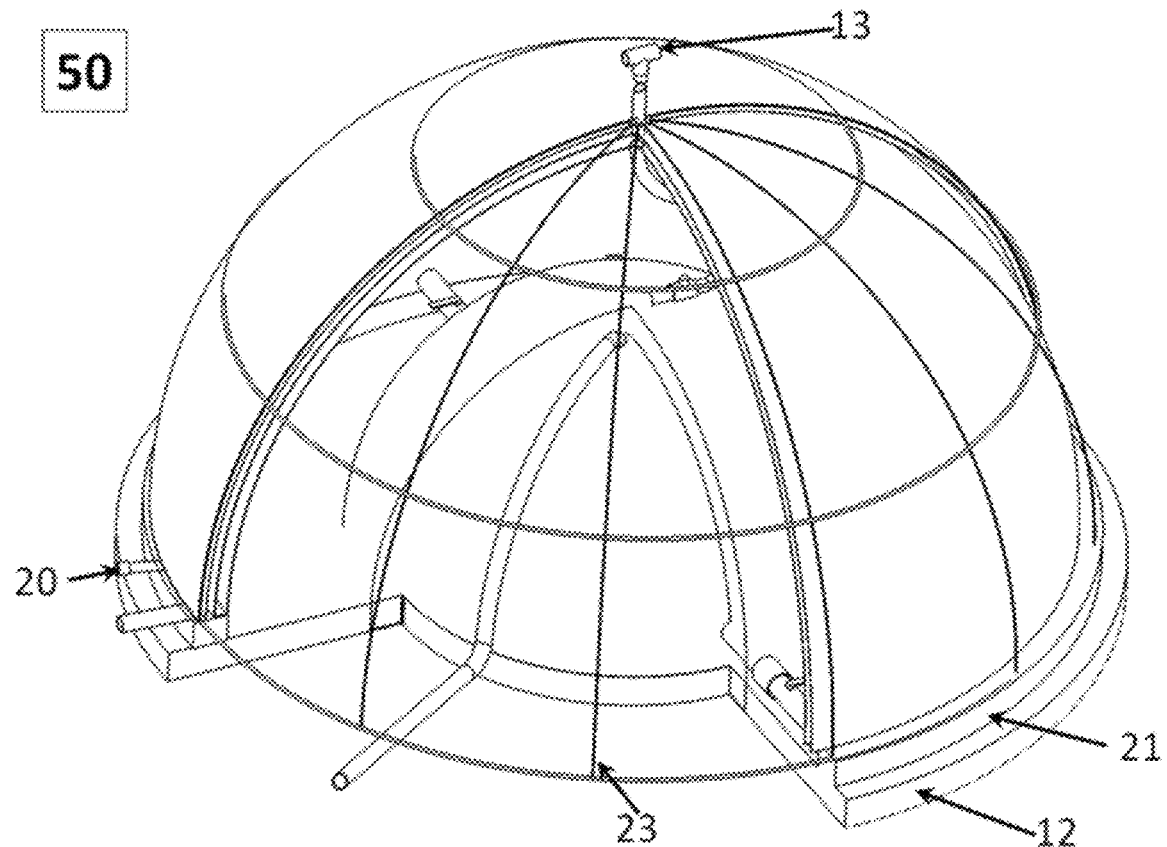
FIG. 2 is a wire frame view of the curved surface absorber type solar fluid heater of FIG. 1.

Referring to FIG. 2, a drain plug 20 connects to the lowest position on the collector 28 to facilitate easy removal of sediment from the fluid heater 50. The hemispherical absorber type solar fluid heater 50 includes a peripheral insulation ring 21 configured along the base of the collector 28. The peripheral insulation ring 21 forms a part of base insulation 12 in accordance with the present invention.

Figure 3:
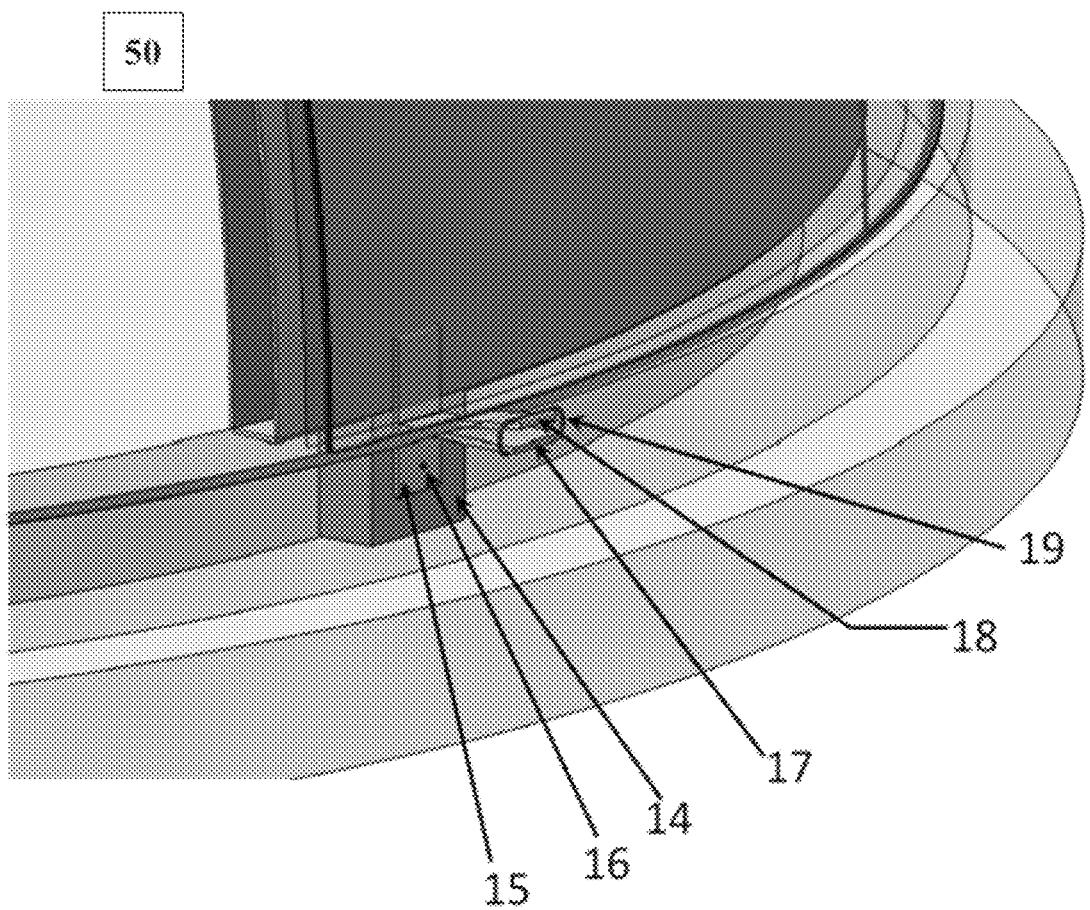
FIG. 3 is a partially expanded perspective view of the curved surface absorber type solar fluid heater of FIG. 1 showing details of supports and locking of glazing defined thereon.

Referring to FIG. 3, a locking mechanism adapted for glazing 1, 2 along its support grill to base support of a curved surface absorber type solar fluid heater 50 in accordance with the present invention is shown. The curved surface absorber type solar fluid heater 50 includes a plurality of supports 14. The supports 14 are held in position using respective locking arrangement/mechanism that includes a plurality of strips 15, a plurality of screws 16, a bottom locking plate 17, a top locking plate 18, and a locking clip 19.

Figure 4:
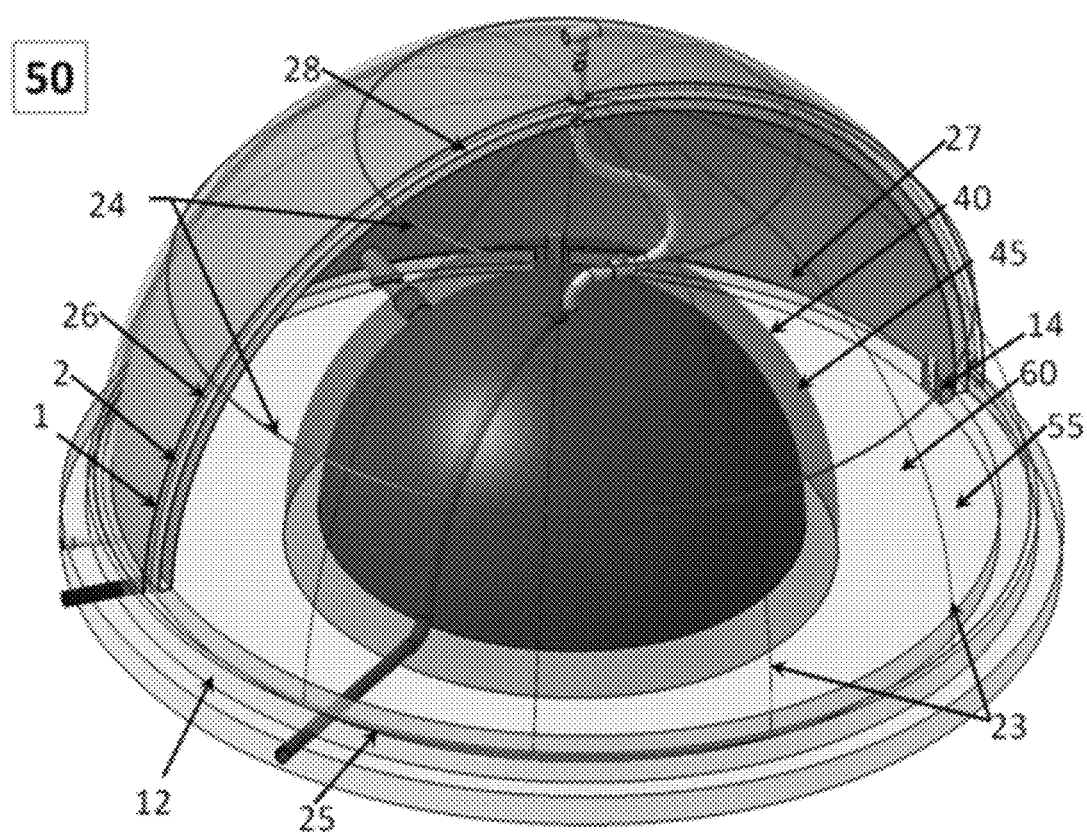
FIG. 4 is a fragmentary sectional perspective view of the curved surface absorber type solar fluid heater of FIG. 1.
Figure 5:
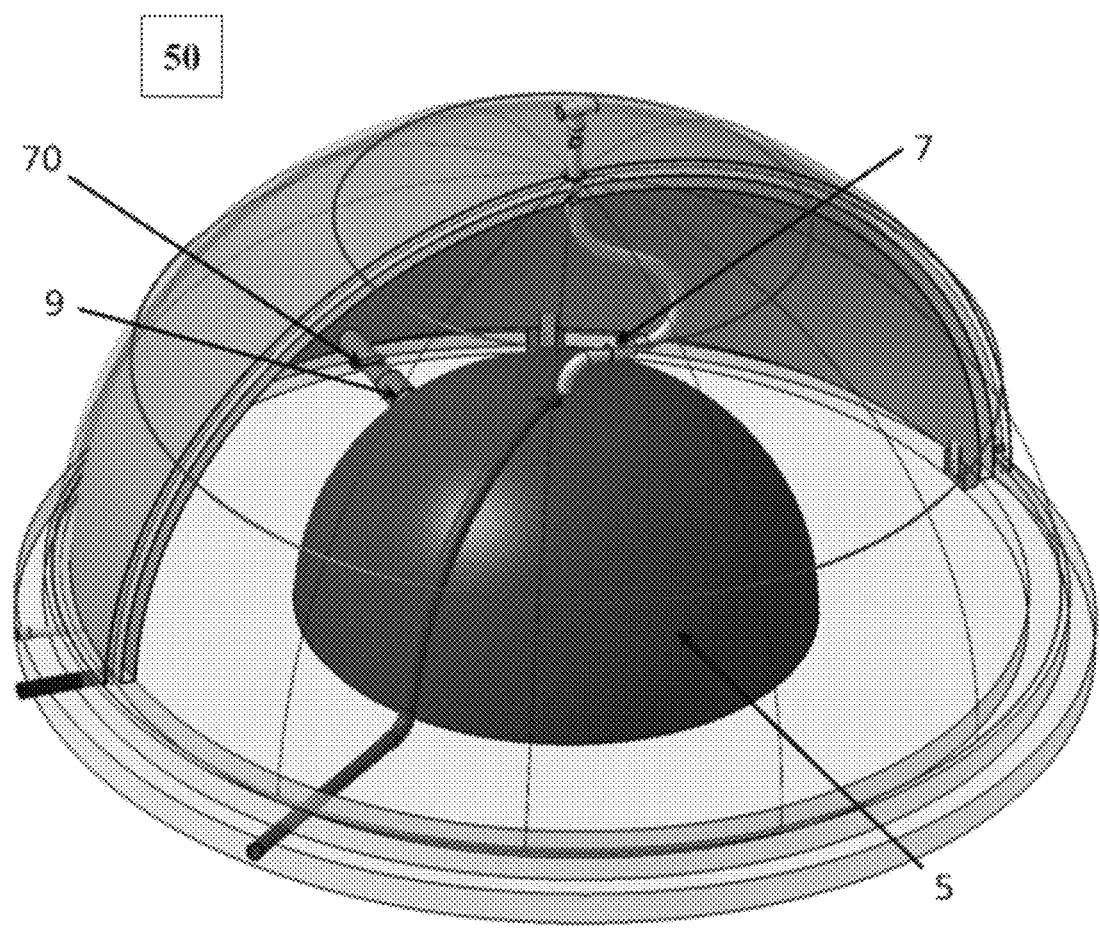
FIG. 5 is a fragmentary sectional perspective view of the curved surface absorber type solar fluid heater of FIG. 1.

Referring to FIGS. 4 and 5, a fragmentary sectional front view of curved surface absorber type solar fluid heater 50 in accordance with the present invention includes a plurality of spacer strips 24 and a plurality of circular rings 25. A third chamber 27 is defined between inner curved surface of collector 28 and the bottom insulation 12. The hot fluid tank 5 has hot fluid tank insulation 11 that includes a vapour barrier 45 covered with a reflective foil 40. The bottom insulation 12 includes a vapour barrier 60 covered with a reflective foil 55. As shown in FIG. 5, the curved surface absorber type solar fluid heater 50 includes an ON/OFF cock 70 mounted on the connectors 9 as illustrated.

Figure 6:
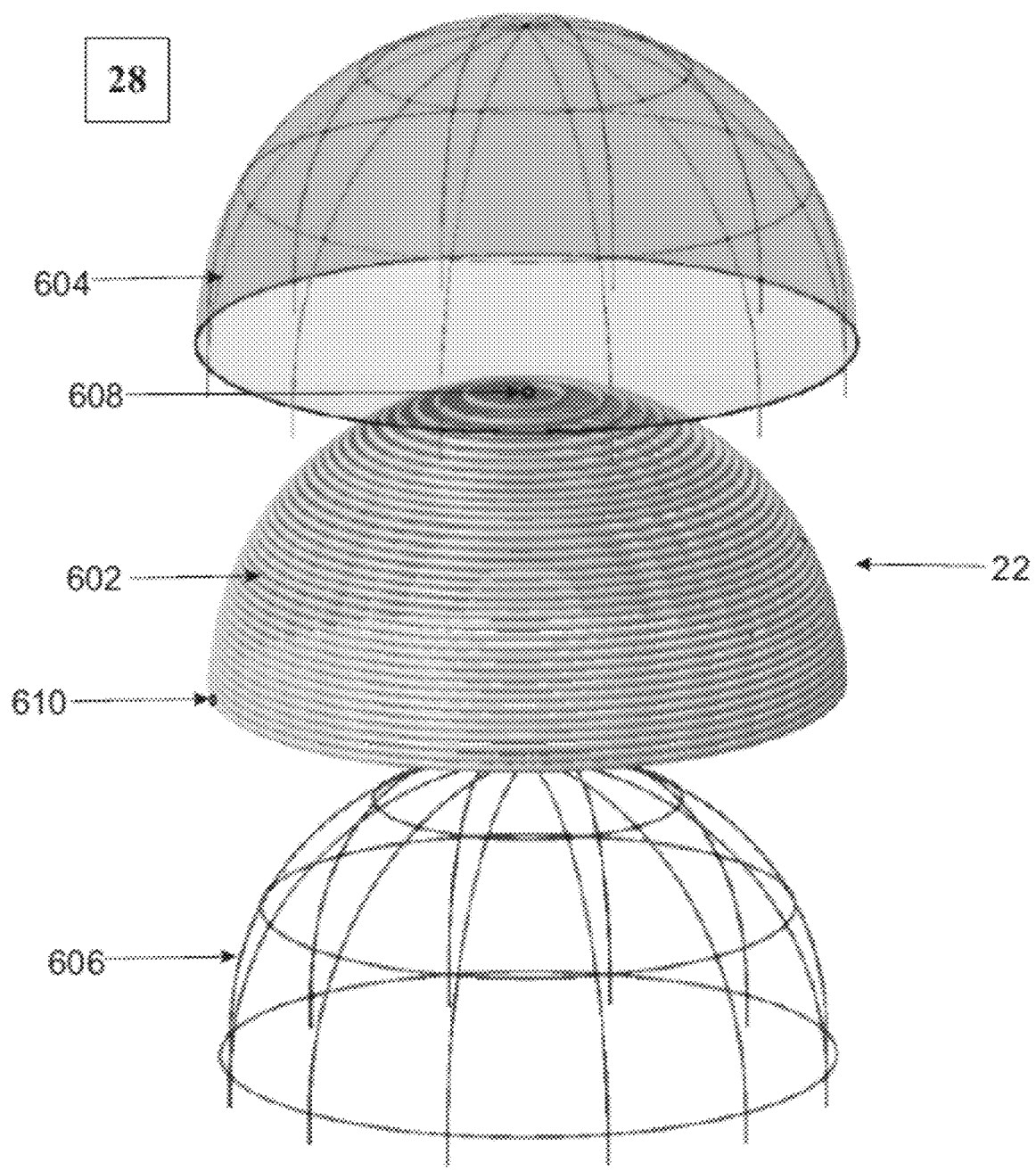
FIG. 6 is a perspective view of an alternative embodiment of the collector of the curved surface absorber type solar fluid heater of FIG. 1.

Referring to FIG. 6, an alternative embodiment of the curved surface absorber type solar fluid heater 50 is shown wherein the second chamber 22 of the collector 28 is formed out of a plurality of tubular members 602 positioned circumferentially on a grid structure formed out of an outer hemispherical glazing 604 and an inner hemispherical support grid 606. Preferably, the tubular members 602 are positioned between the outer hemispherical glazing 604 and inner hemispherical support grid 606 such that the tubular member 602 is wound from a bottom end 610 to a top end 608 thereof. The hemispherical grid structure is designed such that each turn of the tubular member 602 remains snugly fitted with adjacent tubular member 602 to define the second chamber 22 having a tubular hemispherical configuration in accordance with this alternative embodiment. In this alternative embodiment, the bottom end 610 of the tubular member 22 is connected to ambient fluid pipe 8. In this alternative embodiment, the top end 608 of the tubular member 22 is connected to hot fluid tank inlet pipe 6.

Referring to FIGS. 1-6, in operation, an ambient fluid is supplied under predetermined pressure head from the ambient fluid pipe 8 to the second chamber 22 of the collector 28. The hot fluid tank 5 is connected to the collector 28 by the connectors 9.

During sunshine hours, the solar radiation enters through the outer glazing 1 and inner glazing 2 such that the solar radiation is absorbed by black outer curved surface 3 that in turn heats fluid in the second chamber 22. Heating of fluid within the second chamber 22 develops a thermo siphon effect that develops circulation of fluid from bottom portion of the collector 28 to top portion of the collector 28 thereby enabling the heated fluid to enter into the hot fluid tank 5 via the hot fluid tank inlet pipe 6 thereby enabling natural circulation to continue until the thermal equilibrium in between collector 28, hot fluid tank 5, and surrounding environment is achieved. The hot fluid flows from the top of the collector 28 through the hot fluid tank inlet pipe 6 via non-return valve 7. Thus, hot fluid from the hot fluid tank 5 is available for consumption as and when required through the hot fluid tank outlet pipe 10. It is understood here that the collector 28 facilitates the whole hemispherical surface of the second chamber 22 to be utilized for heating of fluid. Further, it is understood that the natural circulation within the collector 28 may be replaced by forced circulation thereby connecting a pump to the ambient fluid pipe 8 in other alternative embodiments of the present invention. Further, it is understood that a series of curved surface absorber type solar fluid heater 50 may be arranged in series thereby subjecting them under forced circulation by attaching pump(s) to their respective ambient fluid pipes 8 when requirement of heated fluid is at a higher flow rate in application areas, such as industrial use.

The collector 28 is supported on the plurality of supports 14. The collector 28 and the glazing 1, 2 are held together on the bottom insulation 12 thereby using the locking arrangement as shown in FIG. 3. However, in an alternative embodiment, the glazing 1, 2 may have a zip lock arrangement to facilitate removal and replacement of the glazing 1, 2 from the curved surface absorber type solar fluid heater 50. The bottom locking plate 17 is attached to support strip 15 and top locking plate 18 is attached to the grill 23 which supports glazing 1, 2. The locking plates are in tension by the locking clip 19, which secures air tight connection between black outer curved surface 3 of collector 28 and glazing 2.

During sunset/night hours, the pivot type dead weight non-return valve 7 performs the function of preventing back flow of fluid from hot fluid tank 5 to collector 28. The non-return valve 7 is preferably connected with predetermined inclination angle ø. In this preferred embodiment, the inclination angle ø is in a range from about 0° to about 90°. However, the inclination angle ø may vary in other alternative embodiments of the present invention. The drain plug 20 is attached to lowest position of the collector chamber 22 as shown in FIG. 2. Base of collector 28 is configured to have a predefined slope towards the drain plug 20 for easy removal of sediments. For descaling, ON/OFF cock 70 is installed on the connectors 9 with proper arrangement for isolating hot fluid tank 5. The ON/OFF cock 70 is also required to be closed to isolate the hot fluid tank 5. It is understood however that the descaling agent is circulated through chamber 22 with proper inlet and outlet arrangement for few cycles until it is flushed out through drain plug 20.

In the context of the present invention, the curved surface absorber type solar fluid heater 50 is designed to maintain a predefined temperature difference ($\Delta T$) of 25° C.-30° C. It is understood here that $\Delta T$ in accordance with the present invention is a temperature difference between cold water inlet temperature and hot water outlet temperature.

In the context of the present invention, the insulation material used is Rock wool that has a density of approximately 96 Kg/m$^3$ and thermal conductivity of approximately 0.045 W/m K. However, it is understood that other types of insulation materials may be used in other alternative embodiments of the present invention. In the context of the present invention, the glazing 1, 2 are made of transparent material including but not limited to Polythene, Polycarbonate, glass and the like. In an alternative embodiment, the curved surface absorber type solar fluid heater 50 may be constructed without the use of glazing 1, 2.

In an embodiment of the present invention, the curved surface absorber type solar fluid heater 50 is a curved surface solar system which consists of a curved surface absorber, making the solar system independent of tracking requirements irrespective of geographic location of installation and/or irrespective of any seasonal requirements and/or irrespective of any part of the year. This facilitates use of said curved surface solar system for heating of fluid and/or generation of electricity by solar cells.

EXAMPLES

Hereinafter, the present invention will be described in more detail based on examples. The examples are not intended to limit the scope of the present invention. It is believed the invention will be better understood from the following detailed examples:

Example 1: Curved Surface Absorber Type Solar Fluid Heater 50 Under Natural Circulation Mode Experiment was conducted on the curved surface absorber type solar fluid heater 50 in a cloudy sky situation wherein average solar radiation was observed to be in a range from about 300 W/m$^2$ to 450 W/m$^2$. Accordingly, in natural circulation mode, the temperature difference between an ambient temperature of the cold water entering from inlet to the collector and hot water coming out from collector was observed to be in a range of 20° C. to 25° C. At 10 O'clock, an inlet temperature of water was 20° C. 10 liters of heated water was drawn at 45° C. after 2 hours of solar heating in natural circulation mode.

Example 2: Curved Surface Absorber Type Solar Fluid Heater 50 Under Natural Circulation Mode Experiment was conducted on the curved surface absorber type solar fluid heater 50 in a clean sky situation wherein average solar radiation was observed to be in a range from about 400 W/m² to 575 W/m². Accordingly, in natural circulation mode, the temperature difference between an ambient temperature of the cold water entering from inlet to the collector and hot water coming out from collector was observed to be in a range of 25° C. to 32° C. At 10 O'clock, an inlet temperature of water was 20° C. 10 liters of heated water was drawn at 52° C. after 2 hours of solar heating in natural circulation mode.

Example 3: Curved Surface Absorber Type Solar Fluid Heater 50 Under Forced Circulation in Parallel Mode Experiment was conducted on the curved surface absorber type solar fluid heater 50 in forced circulation mode wherein an array of collectors 28 was arranged in a parallel arrangement such that simultaneous input of ambient temperature water inlet was given to each collector 28 and hot water was taken out from a common outlet to which outlet of each collector 28 was connected in parallel position. Accordingly, improvement in system response was observed in term of efficiency. It was observed that there was gain of same temperature in force circulation mode for the same amount of water in less time in comparison to natural mode.

Example 4: Curved Surface Absorber Type Solar Fluid Heater 50 Under Forced Circulation in Series Mode Experiment was conducted on the curved surface absorber type solar fluid heater 50 in forced circulation mode wherein array of collectors 28 was arranged in a series arrangement such that the ambient temperature water input was given to the inlet of the first collector 28 and hot water outlet of the first collector 28 was connected to the inlet of the next collector 28. In series mode, the temperature rise was observed to be higher than that of temperature rise under the forced circulation in parallel mode. In series mode, the flow rate of water was observed to be lower than the flow rate of the water under forced circulation in parallel mode.

The embodiments of the invention shown and discussed herein are merely illustrative of modes of application of the present invention. Reference to details in this discussion is not intended to limit the scope of the claims to these details, or to the figures used to illustrate the invention.

It is understood that various omission and substitutions of equivalents are contemplated as circumstance may suggest or render expedient, but such are intended to cover the application or implementation without departing from the scope of the present invention.

It is therefore contemplated that the appended claims will embrace any such alternatives, modifications and variations as falling within the true scope and spirit of the present invention.

Thus, having described the invention, what is claimed is:

1. A curved surface absorber type solar fluid heater for heating fluid, comprising:
   a base insulation having a vapour barrier covered by reflective foil;
   a glazing, the glazing having at least two radially spaced transparent hemispherical curved surfaces, closed at bottom periphery, defining an exterior surface, an interior surface, and a first chamber therebetween, the glazing being supported with a support grill, the glazing being supported on the insulation base through a peripheral insulation ring;
   a collector disposed within the interior surface of the glazing, the collector having at least two radially spaced hemispherical curved surfaces, closed at bottom periphery, defining a second chamber therebetween, the collector positioned on the base insulation along the peripheral insulation ring, the collector configured to receive a fluid to be heated therein, the collector having an air vent configured on a highest position thereof, the collector having a drain plug configured on a lowest position thereof, and wherein a whole hemispherical surface of the second chamber is utilized for heating of fluid;
   a hot fluid tank, the hot fluid tank having a hemispherical configuration, the hot fluid tank positioned within an enclosure formed between the collector and the base insulation, the hot fluid tank having a hot fluid tank inlet pipe connected to a top end thereof and in fluid communication with the second chamber, the hot fluid tank having an opposed pair of recirculation connectors connected thereto; and
   a locking arrangement facilitating locking of the collector and the glazing on the base insulation, the locking arrangement including a plurality of strips, a plurality of screws, a bottom locking plate, a top locking plate, and a locking clip.

2. The curved surface absorber type solar fluid heater as claimed in claim 1, wherein the recirculation connectors facilitate flow of fluid between the collector and hot fluid tank.

3. The curved surface absorber type solar fluid heater as claimed in claim 1, wherein the hot fluid tank has a hot fluid tank outlet pipe connected thereto.

4. The curved surface absorber type solar fluid heater as claimed in claim 1, wherein the hot fluid tank inlet pipe having a non-return valve positioned thereon.

5. The curved surface absorber type solar fluid heater as claimed in claim 4, wherein the non-return valve is a pivot type dead weight inclined with the base at an angle greater than 0° and less than 90°.

6. The curved surface absorber type solar fluid heater as claimed in claim 1, wherein the hot fluid tank is covered with insulation such that the insulation is positioned with a vapour barrier covered with a reflective foil.

7. The curved surface absorber type solar fluid heater as claimed in claim 1, wherein the glazing is removable and replaceable.

8. The curved surface absorber type solar fluid heater as claimed in claim 1, wherein the hot fluid tank inlet pipe connects the second chamber to the hot fluid tank.

9. The curved surface absorber type solar fluid heater as claimed in claim 1, wherein the recirculation connectors facilitate flow of fluid from the hot water tank to the collector during sunshine hours.

10. The curved surface absorber type solar fluid heater as claimed in claim 1, wherein the recirculation connectors facilitate flow of fluid from the collector to hot water tank during usage of hot water stored in the hot water tank.

11. The curved surface absorber type solar fluid heater as claimed in claim 1, wherein an ambient fluid pipe is positioned along a plane that is normal to a plane of recirculation connectors thereby having an angle of 90° therebetween.

12. The curved surface absorber type solar fluid heater as claimed in claim 1, wherein the second chamber of the collector is made of a plurality of tubular members positioned circumferentially on a grid structure formed out of an outer hemispherical glazing supported by grid and an inner hemispherical support grid.

13. The curved surface absorber type solar fluid heater as claimed in claim 1, wherein non-return valve prevents backflow of fluid from hot fluid tank towards the collector in absence or poor solar radiation.

14. The curved surface absorber type solar fluid heater as claimed in claim 1, wherein the glazing is attached from outer side of the collector with locking arrangement.

15. The curved surface absorber type solar fluid heater as claimed in claim 1, wherein an ON/OFF cock isolates the hot fluid tank from the collector.

16. The curved surface absorber type solar fluid heater as claimed in claim 1, wherein said fluid heater is a curved surface solar system which consists of a curved surface absorber, making the solar system independent of tracking requirements irrespective of geographic location of installation and/or irrespective of any seasonal requirements and/or irrespective of any part of the year.

17. The curved surface absorber type solar fluid heater as claimed in claim 16, wherein said curved surface solar system facilitates heating of fluid and/or generation of electricity by solar cells.

18. A curved surface absorber type solar fluid heater for heating fluid, comprising:
 a base insulation having a vapour barrier covered by reflective foil;
 a glazing, the glazing having at least two radially spaced transparent hemispherical curved surfaces, closed at bottom periphery, defining an exterior surface, an interior surface, and a first chamber therebetween, the glazing being supported with a support grill, the glazing being supported on the insulation base through a peripheral insulation ring;
 a collector disposed within the interior surface of the glazing, the collector having at least two radially spaced hemispherical curved surfaces, closed at bottom periphery, defining a second chamber therebetween, the collector positioned on the base insulation along the peripheral insulation ring, the collector configured to receive a fluid to be heated therein, the collector having an air vent configured on a highest position thereof, the collector having a drain plug configured on a lowest position thereof, and wherein a whole hemispherical surface of the second chamber is utilized for heating of fluid;
 a hot fluid tank, the hot fluid tank having a hemispherical configuration, the hot fluid tank positioned within an enclosure formed between the collector and the base insulation, the hot fluid tank having an outlet pipe and a hot fluid tank non-return valve connected to a top end thereof and in fluid communication with the second chamber, wherein the non-return valve is a pivot type dead weight inclined with said base insulation at an angle greater than 0° and less than 90°, said non-return valve configured to prevent backflow of fluid from the hot fluid tank towards the collector during an absence of solar radiation, the hot fluid tank having an opposed pair of recirculation connectors connected thereto; and
 a locking arrangement facilitating locking of the collector and the glazing on the base insulation, the locking arrangement including a plurality of strips, a plurality of screws, a bottom locking plate, a top locking plate, and a locking clip.

19. A curved surface absorber type solar fluid heater for heating fluid, comprising:
 a base insulation having a vapour barrier covered by reflective foil;
 a glazing, the glazing having at least two radially spaced transparent hemispherical curved surfaces, closed at bottom periphery, defining an exterior surface, an interior surface, and a first chamber therebetween, the glazing being supported with a support grill, the glazing being supported on the insulation base through a peripheral insulation ring;
 a collector disposed within the interior surface of the glazing, the collector having at least two radially spaced hemispherical curved surfaces, closed at bottom periphery, defining a second chamber therebetween, the collector positioned on the base insulation along the peripheral insulation ring, the collector configured to receive a fluid to be heated therein, the collector having an air vent configured on a highest position thereof, the collector having a drain plug configured on a lowest position thereof, and wherein a whole hemispherical surface of the second chamber is utilized for heating of fluid and wherein said second chamber is formed out of a tubular member having a bottom end and a top end, said tubular member positioned between an outer hemispherical glazing and an inner hemispherical support such that said tubular member is wound from the bottom end to the top end thereof to form a tubular hemispherical configuration, said tubular member bottom end in fluid communication with an ambient fluid pipe, said tubular member top end in fluid communication with a hot fluid tank inlet pipe;
 a hot fluid tank, the hot fluid tank having a hemispherical configuration, the hot fluid tank positioned within an enclosure formed between the collector and the base insulation, the hot fluid tank in fluid communication with the hot fluid tank inlet pipe at a top end thereof, the hot fluid tank having an opposed pair of recirculation connectors connected thereto; and
 a locking arrangement facilitating locking of the collector and the glazing on the base insulation, the locking arrangement including a plurality of strips, a plurality of screws, a bottom locking plate, a top locking plate, and a locking clip.

* * * * *